United States Patent [19]

Streeter

[11] 4,141,582
[45] Feb. 27, 1979

[54] MULTI-PURPOSE TAIL GATE

[76] Inventor: Erwin C. Streeter, 1417 Bernardston Rd., Greenfield, Mass. 01301

[21] Appl. No.: 780,291

[22] Filed: Mar. 23, 1977

[51] Int. Cl.² .............................................. B60P 1/04
[52] U.S. Cl. ........................................ 296/50; 296/53; 296/55; 298/23 M
[58] Field of Search ....................... 296/50, 53, 55, 58, 296/61; 298/23 M, 23 MD

[56] References Cited

U.S. PATENT DOCUMENTS

| 2,645,522 | 7/1953 | Kersey | 298/23 MD |
| 2,683,545 | 7/1954 | Wood | 298/23 MD X |
| 3,254,919 | 7/1966 | Birchmeier | 293/23 MD |

Primary Examiner—Joseph F. Peters, Jr.
Assistant Examiner—Gene A. Church
Attorney, Agent, or Firm—Ross, Ross & Flavin

[57] ABSTRACT

In combination, a tail gate for a dump-type vehicle, such as a truck, wagon, semi-trailer or the like, of the type having an open box mounted for pivotal tilting movement relative to the vehicle frame and including a bed and upright side walls, and power and linkage means mounting the tail gate for movement relative to the box between a closed position wherein it embraces the bed and side walls in a box closing mode and a plurality of positions wherein it is raised rearwardly and upwardly relative to the box, and an extended bed position and a ramp position.

1 Claim, 9 Drawing Figures

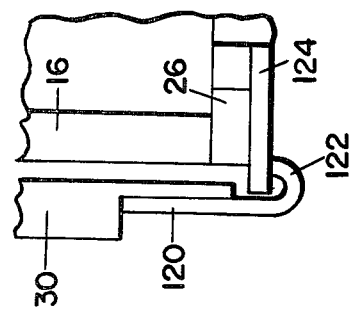
FIG. 6.
FIG. 5.
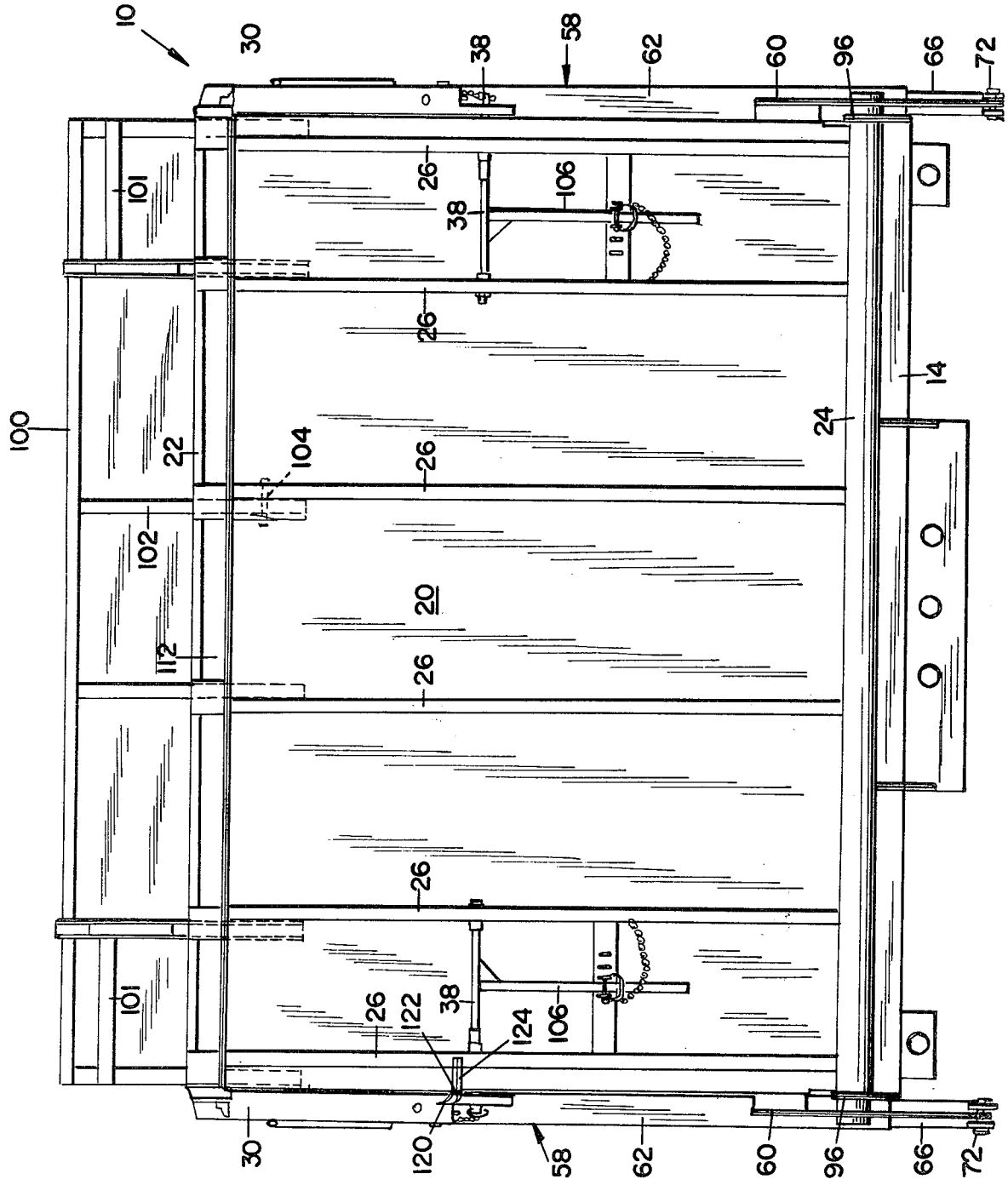

MULTI-PURPOSE TAIL GATE

My invention is directed to a multi-purpose tail gate which can: a) serve to close the box of a dump-type vehicle; b) serve in a partially opened position to provide a draft permitting escape of air from the box to reduce air resistance; c) serve in any one of a plurality of raised positions to permit easy unloading of such as grain or the like from the box; d) serve in an extended bed position to provide an extension of the bed proper of the box; and e) serve in a ramp position for loading or unloading animals and miscellaneous equipment from the vehicle.

A primary object of the invention is to provide a multi-purpose tail gate of the type described which is simple in its construction, reliable in its use and economical to produce.

Herein, a single power and linkage system is employed to permit use of the tail gate in a multipicity of ways.

A modified form of the invention is also provided which may be used with a toy vehicle. In the drawings:

FIG. 5 is a rear elevational view of the tail gate of the invention, the gate being shown in closed position;

FIG. 6 is an enlarged, fragmentary top plan view of the safety latch means;

Figure 1:
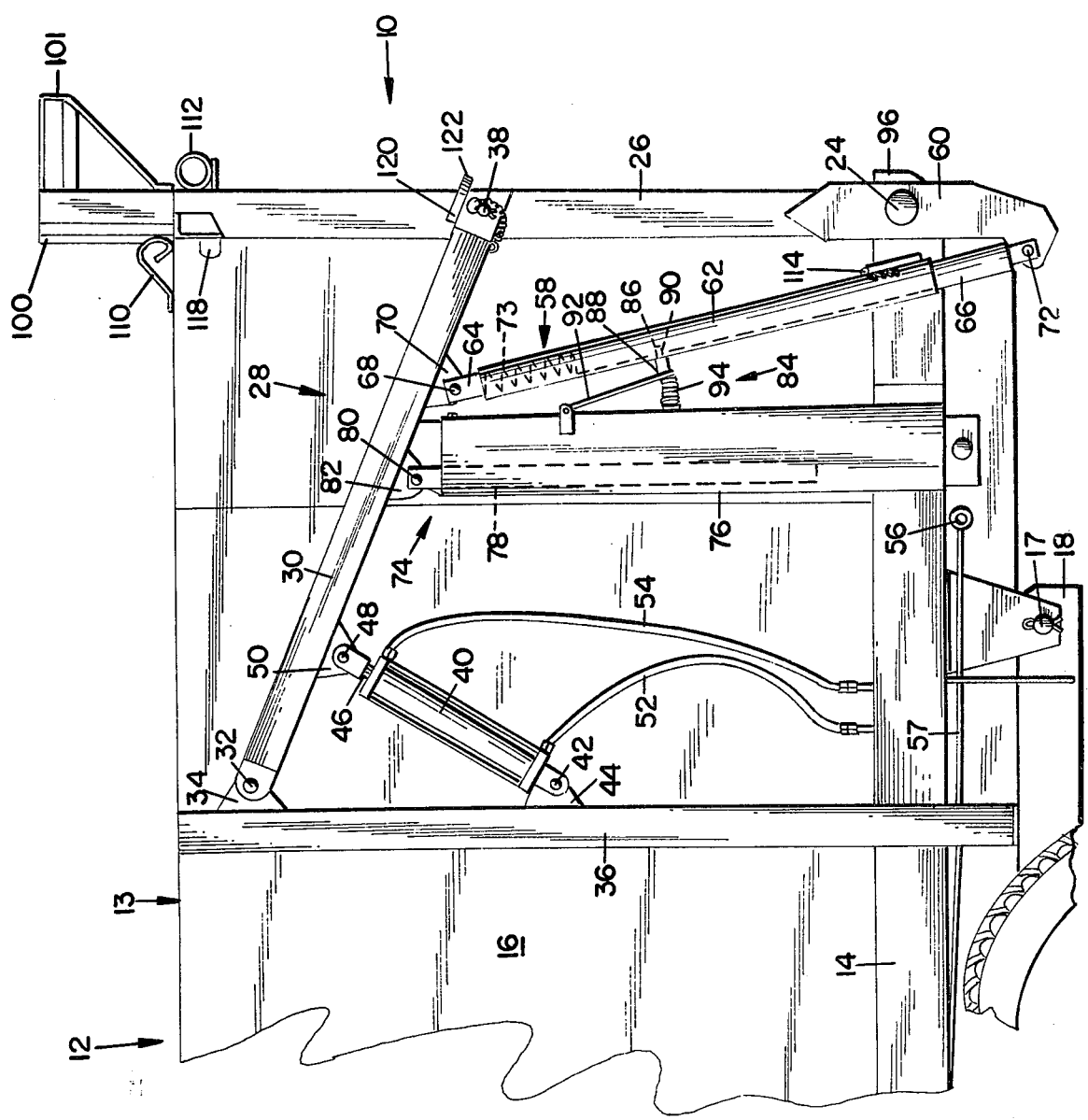
FIG. 1 is a fragmentary side elevational view of a portion of a vehicle body having a multipurpose tail gate embodying a preferred form of the invention attached thereto, the tail gate being shown in closed position.

In a preferred embodiment of the invention shown in FIGS. 1–6, a multi-purpose tail gate 10 is mounted on the rear portion of such as a dump-type vehicle 12 of conventional type including a cab, not shown, and having an open box 13 for carrying grain, fertilizer, trash, animals, farm and other equipment and the like.

Box 13 has a flat bed or platform 14 and the usual upright side walls 16. The box is pivotally mounted as at 17 relative to a vehicle frame 18 for elevation and tilting by power means, not shown, relative to the frame in known manner so as to remove by gravity materials carried therein.

Tail gate 10 includes a rectangular panel 20, (see FIG. 5), bordered at its upper and lower ends by horizontally-extending upper and lower reinforcing rails 22 and 24 respectively fixed thereto and having a plurality of spaced, parallel vertically disposed reinforcing rails 26 fixed thereto and extending between rails 22 and 24.

Linkage and power means 28 are provided at each side of the vehicle for pivotally mounting the tail gate relative to box 13. Only one such linkage and power means will be described hereafollowing, they being identical.

Linkage and lower means 28 includes a generally horizontally disposed lifting arm 30 pivotally connected at one end at 32 to a bracket 34 provided on an upright support member 36 fixed to the adjacent box side wall 16, the lifting arm being releasably and pivotally connected at its opposite end by a side bolt 38, to be described, to one of the vertical reinforcing rails 26 adjacent the side edge of the tail gate.

An angularly disposed hydraulic cylinder 40 is pivoted at its base at 42 to a bracket 44 on support member 36, and a piston rod 46 of the cylinder is pivoted at its outer end at 48 to a bracket 50 on lifter arm 30.

A fluid supply means, not shown, in the form of a conventional hydraulic pump or the like operates the cylinder through fluid supply lines 52 and 54 in known manner, being controlled by a control valve 56 located adjacent the cylinder. The cylinder may be operated remotely from the vehicle cab by a line 57 connected to the valve and extending to the cab.

Linkage and power means 28 additionally includes a telescopic first guide means 58 which extends angularly between lifting arm 30 and a crank lever 60 which is fixed to and extends downwardly from one of the vertical reinforcing rails 26 disposed adjacent the side edge of the tail gate.

First guide means 58 includes a tubular member 62 which has a connector 64 extending outwardly from its upper end and a slide rod 66 which is sleeved by the tubular member and extends outwardly from the lower end of the latter.

The upper end of connector 64 is pivoted at 68 to a bracket 70 on lifting arm 30.

The upper end of slide rod 66 is slidably disposed in tubular member 62 and its opposite end is pivoted at 72 to crank lever 60. A compression spring 73 is disposed within tubular member 62 between the upper end of the latter and the upper end of slide rod 66 to load the slide rod.

A detent type locking means 84 is provided for locking slide rod 66 relative to tubular member 62 in the gate closed position, the detent locking means including a spring-loaded locking pin 86 slidably related to a sleeve 88 extending outwardly from a side of tubular member 62 and receivable in an opening 90 adjacent the upper end of slide rod 66.

Actuation of locking pin 86 to locking position is effected by a biasing arm or striker plate 92 pivoted at its upper end to an upright, hollow housing 76 fixed to box side wall 16 adjacent first guide means 58. A compression spring 94 is disposed between the lower end of striker plate 92 and housing 76.

In the gate closed position, biasing arm 92 urges locking pin 86 into opening 90 in slide rod 66 to preclude movement of the slide rod.

A second guide means 74 includes upright hollow housing 76 and a guide arm 78 having its lower end freely disposed in housing 76. The guide arm 78 is pivoted at its upper end at 80 to a bracket 82 provided on lifting arm 30.

The lower end of the tail gate is releasably and pivotally connected to box 13 by engagement of the tail gate lower reinforcing rail 24 in a pair of gate hooks or hinges 96, disposed one at each side of the box and formed as extensions on bed or platform 14.

A cattle gate extension 100 is releasably fixed to the upper end of tail gate 10 by means of a plurality of vertical rails 102, (see FIG. 5), which depend from the extension and pass through provided openings in upper reinforcing rail 22. A pin 104 extends through one of the upright rails 26 of the tail gate and one of the vertical rails 102 of the extension to retain the extension in place. The extension may be removed by removing pin 104 and lifting the extension upwardly.

As best seen in FIG. 5, slide bolt 38 is horizontally disposed and each end thereof passes through provided openings in vertical reinforcing rails 26 of the tail gate. A centrally-disposed handle 106 depends from slide bolt 38 and is used to move the slide bolt horizontally into and out of locking engagement with lifting arm 30.

Figure 2:
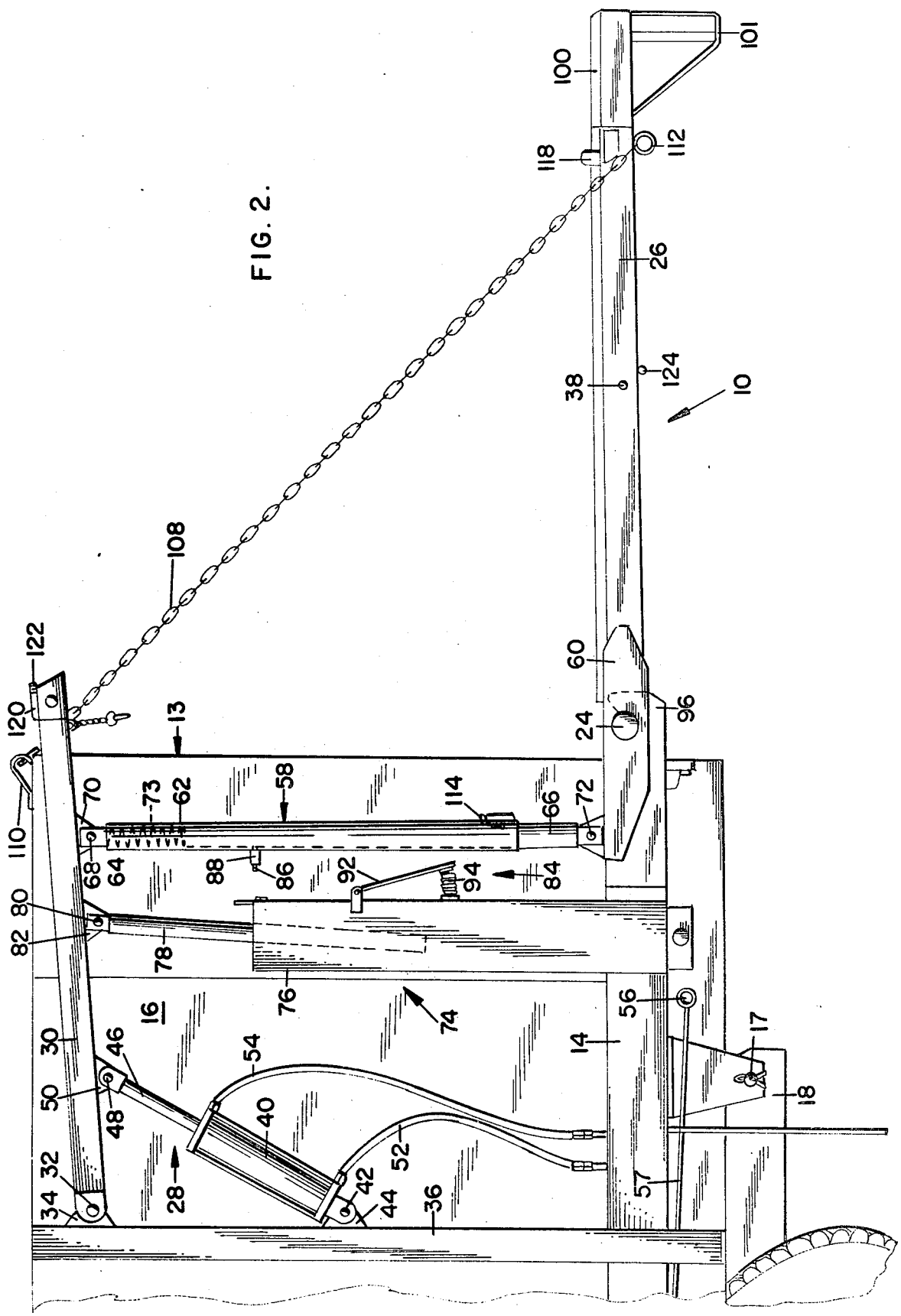
FIG. 2 is a view similar to FIG. 1, showing the tail gate in an opened, extended bed position.
Figure 3:
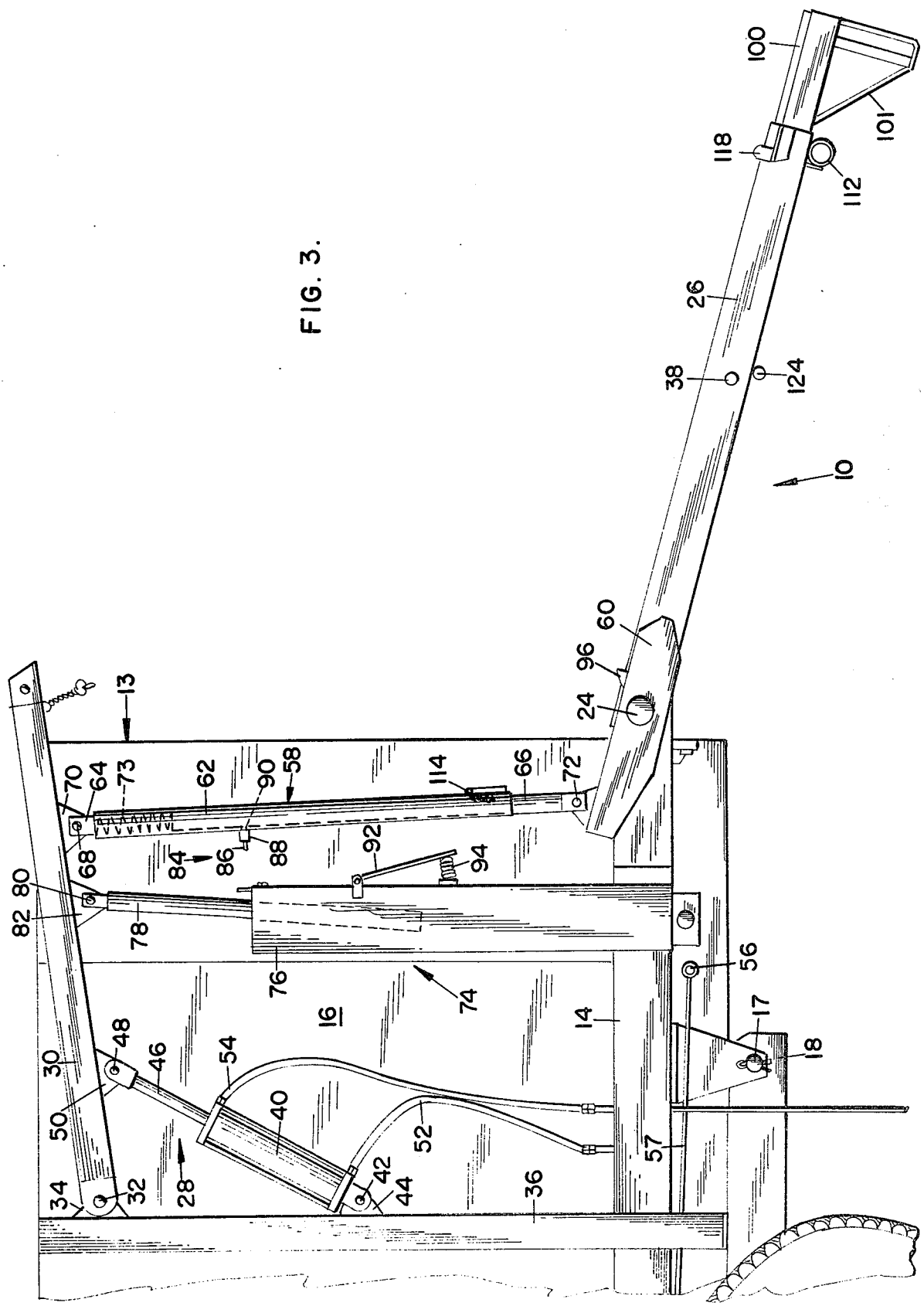
FIG. 3 is a view similar to FIG. 1, showing the tail gate in an opened, ramp position.

When the tail gate is to be used in one of the modes shown in FIGS. 2 or 3, the slide bolt is removed from egagement with each lifting arm 30, whereupon the tail gate may be pivoted relative to gate hooks or hinges 96, with pivoting movement of the tail gate being effected by cylinders 40 acting through lifting arms 30 and first guide means 58.

When the tail gate is to be used as an extended bed as in FIG. 2, it is lowered to a position wherein it is aligned with the box bed or platform 14. A reinforcing chain 108 is then extended between the upper end of the tail gate and a bracket 110 provided on the upper surface of each box side wall 16.

When the tail gate is to be used as a ramp as in FIG. 3, the tail gate is lowered to a position wherein stands 101 provided on cattle gate extension 100 are resting on the ground or other surface. Should the cattle gate extension not be used, a rail 112 provided on the upper end of the tail gate will engage the ground or other surface, this latter construction being preferrable when heavier equipment is being loaded or unloaded.

Figure 4:
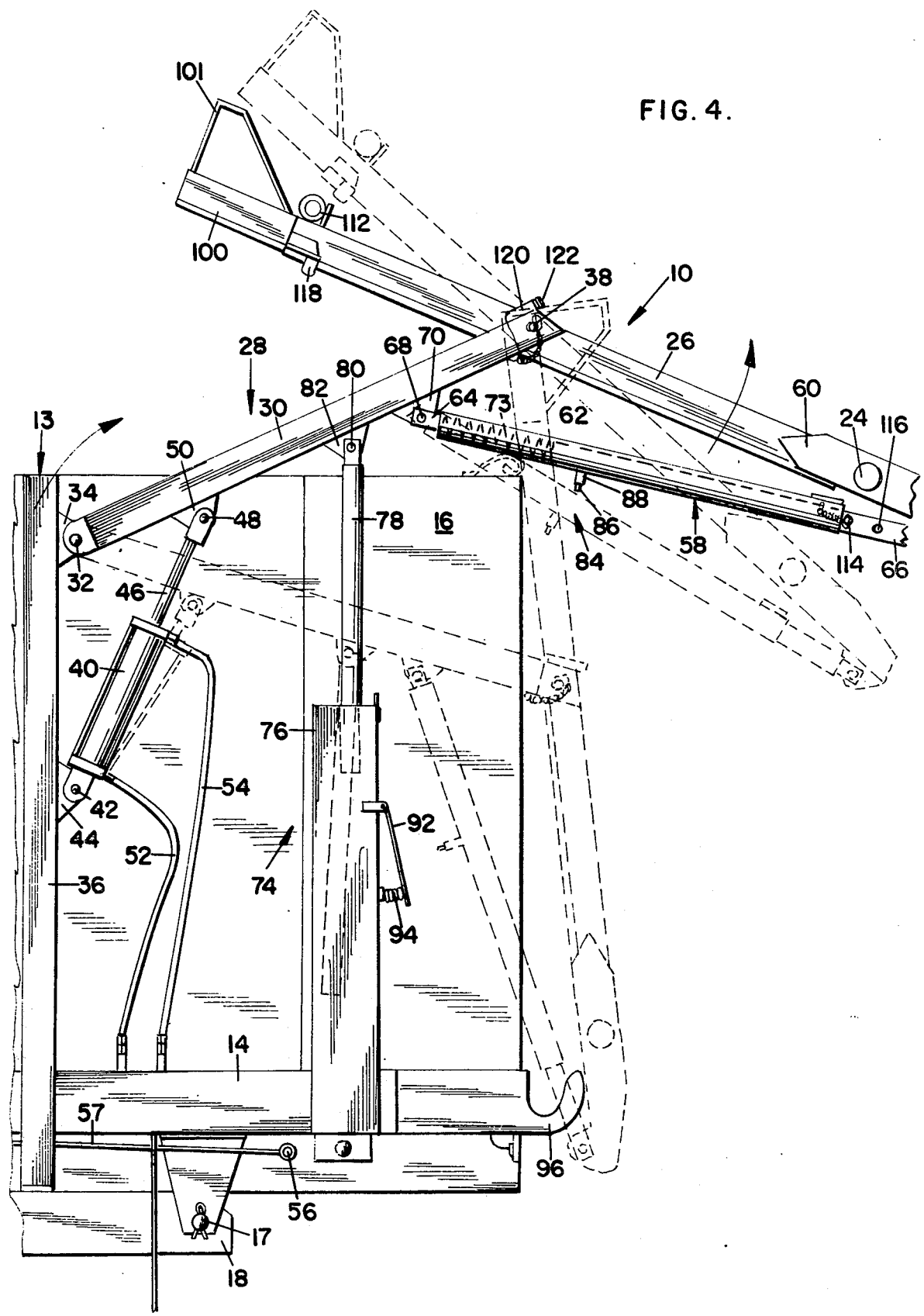
FIG. 4 is a view similar to FIG. 1, showing the tail gate in several raised or overhead opened positions.

When the tail gate is to be used in the modes as indicated in FIG. 4, slide bolts 38 are engaged with lever arms 30, whereby actuation of cylinders 40 causes lifting arms 30 and first guide means 58 to raise the tail gate, with second guide means 74 guiding movement of the lifting arms and also serving to preclude outward movement of the box side walls 16.

The tail gate may be only partially raised, as shown in the lowermost phantom position in FIG 4, whereby air resistance within the box is reduced, as the vehicle is driven at highway speeds, this being possible since air is evacuated through the space left between the base of the tail gate and the box bed. The tail gate cannot move since it is locked in position by the lifting arms 30 the first and second guide means, and the cylinders.

The tail gate may be elevated to the fully raised position, as shown in solid lines in FIG. 4, or it may be moved to a plurality of partially raised positions, two of which are shown in phantom in FIG. 4. In all cases, the tail gate swings relative to lifting arms 30 at the pivots represented by slide bolts 38, such swinging movement being effected by the combined action of the lifting arms, the first guide means 58 and the cylinders 40.

In the gate raised positions, a locking pin 114 connected to tubular member 62 of first guide means 58 is inserted in one of a pair of openings 116, (see FIG. 4) in slide rod 66 to securely lock the tail gate against movement until the locking pin is removed.

To return the tail gate to closed position, locking pins 114 are removed and each cylinder is reversed, causing the lifting arms to swing downwardly relative to pivots 32 to effect a concomitant downward swinging movement of the tail gate relative to slide bolts 38, such movement being guided by the first and second guide means.

In the fully closed position of FIG. 1, a latch 118 provided at the upper end of the tail gate at each of the outermost vertical reinforcing rails, embraces the adjacent box side wall 16 to preclude the side walls from spreading outwardly when the vehicle is loaded.

A safety latch 120 extends outwardly from the outer end of lifting arm 30 and has a curved end 122 which is adapted to engage a bolt 124 provided on one of the outer reinforcing rails 26 of the tail gate (see FIG. 6).

Safety latch 120 precludes free fall of the tail gate when slide bolts 38 are removed.

Figure 8:
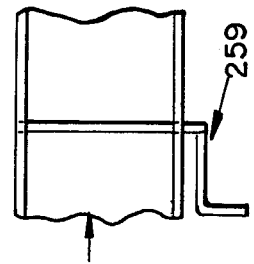
FIG. 8 is a schematic showing of the linkage means for tilting the box of the FIG. 8 toy vehicle.
Figure 9:
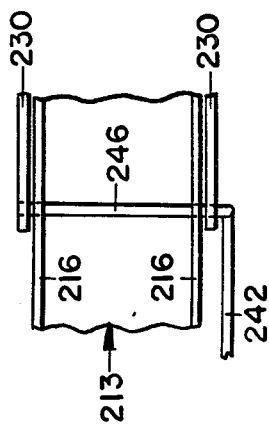
FIG. 9 is a schematic showing of the linkage means for operating the tail gate of the FIG. 8 toy vehicle.
Figure 7:
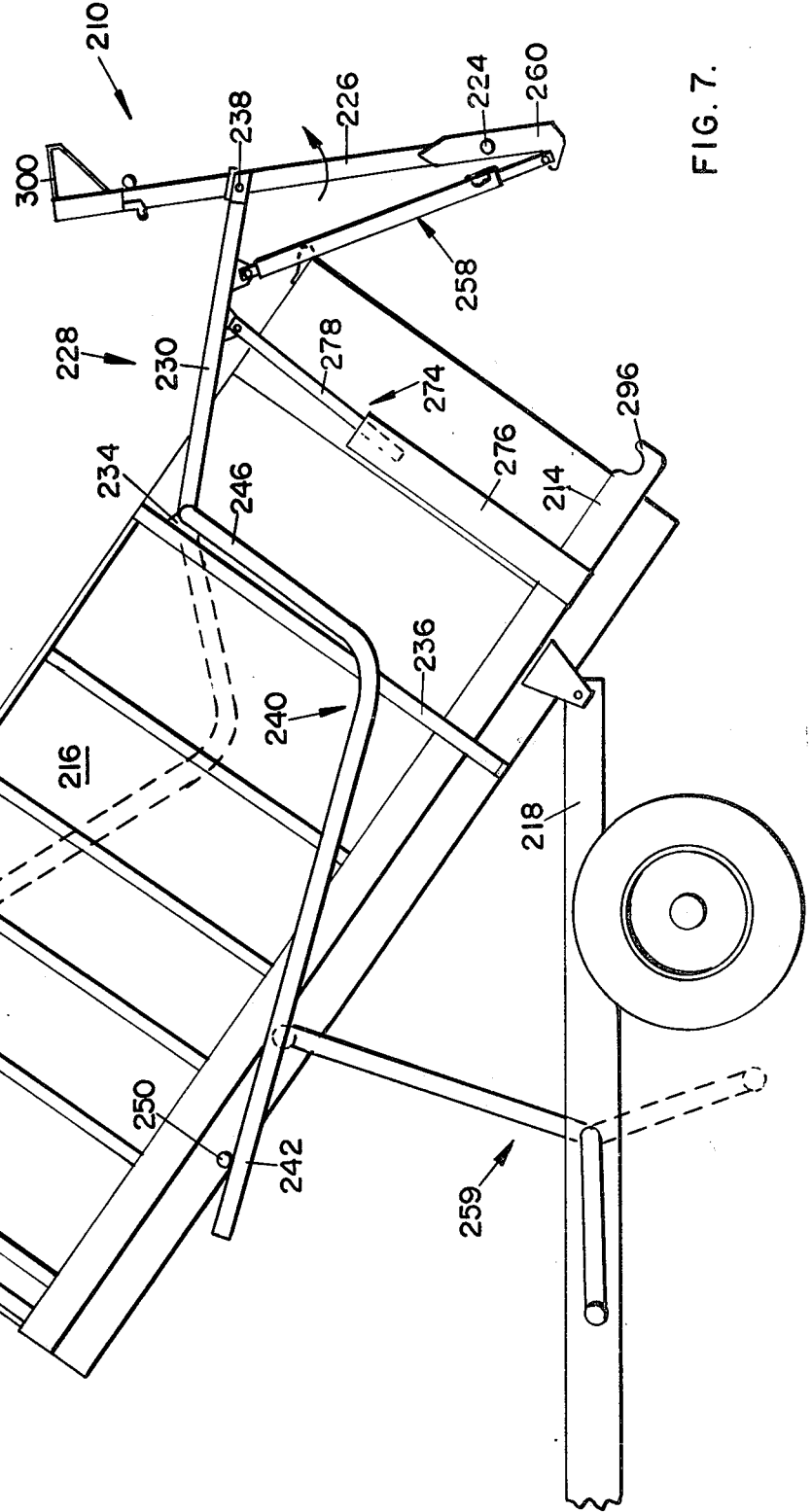
FIG. 7 is a fragmentary side elevational view of a modified form of the invention as employed with a toy vehicle.

In the modified form of the invention shown in FIGS. 7-9, a tail gate 210 is used on a toy vehicle 212. It differs from the embodiment of FIGS. 1-6 only in that mechanical power means is used to tilt the vehicle box 213 relative to the vehicle frame 218 and to motivate the tail gate relative to the box.

Linkage and power means 228 are provided at each side of the vehicle for pivotally mounting the tail gate relative to the box.

Linkage and power means 228 includes a generally horizontally disposed lifting arm 230 pivotally connected at one end to a bracket 234 provided on an upright support member 236 fixed to the adjacent box side wall 216, the lifting arm being releasably and pivotally connected at its opposite end by a slide bolt 238 to one of the vertical reinforcing rails 226 of the tail gate.

A mechanical linkage means 240 replaces the hydraulic cylinder 40 of the FIGS. 1-6 embodiment and includes a hand engageable actuating arm 242 having an offset portion 246 which is journalled in bracket 234 and passes through the adjacent end of lifting arm 230 in tight fitting manner. Offset portion 246 extends across the box, through both side walls 216 and the other bracket 234 and is tightly fitted in the other lifting arm 230.

In the solid line position of FIG. 7, the actuating arm 242 has been rotated downwardly to cause the lifting arm 230 to swing the tail gate 210 to a raised position. The actuating arm may be locked in that position by moving it under a stop 250 provided adjacent the lower edge of box side wall 216.

In the dash line position of FIG. 7, the actuating arm 242 has been rotated upwardly. In this position the tail gate will have been moved to a closed position. The actuating arm may be locked in that position by moving it over a stop 251 provided adjacent the upper edge of box side wall 216.

A simple crank arrangement 259, shown schematically in FIG. 8, is operatively connected to the frame 218 and box 213 for moving the box between lowered and tilted position.

Linkage and power means 228 additionally includes a telescopic first guide means 258 which is similar to first guide means 58 of the FIGS. 1-6 embodiment and which extends angularly between and is pivoted to lifting arm 230 and a crank lever 260 which is fixed to and extends downwardly from one or the vertical reinforcing rails 226 disposed adjacent the side edge of the tail gate.

A second guide means 274 similar to second guide means 74 of the FIGS. 1-6 embodiment includes an upright hollow housing 276 fixed to box side wall 216 adjacent first guide means 258 and a guide arm 278 having its lower end freely disposed in housing 276. The guide arm 278 is pivoted at its upper end to lifting arm 230.

The lower end of the tail gate is releasably and pivotally connected to box 213 by engagement of the tail gate lower reinforcing rail 224 in a pair of gate hooks or hinges 296, disposed one at each side of the box and formed as extensions on bed or platform 214.

A cattle gate extension 300 is releasably fixed to the upper end of tail gate 210.

I claim:

1. A multi-position tail gate subassembly in combination with a dump-type vehicle pivotally mounting a box having an open rear end with cooperant power means for shifting the box between a normal flat position and a multiplicity of tilted dumping positions relative to the vehicle comprising:

a panel located at the box rear end,
 a gate hook fixed to and projecting rearwardly from the box at each side thereof,
 powered linkage means at opposite ends of the panel for motivating the panel with respect to the box rear end,
 each powered linkage means including a panel lifting arm pivotally connected at its inboard end to a respective side of the box and pivotally and releasably connected at its outboard end to a respective end of the panel,
 and a crank lever fixed to a respective end of the panel, and a spring-loaded guide means comprising a tubular member having a connector extending outwardly from one of of its ends and a slide rod which is sleeved by the tubular member and extend outwardly from its opposite end and a compresssion spring disposed within the tubular member between the connector and slide rod, the free end of the connector being pivotally connected to the lifting arm and the free end of the slide rod being pivotally connected to the crank lever for projecting the panel lifting arm upwardly as the crank lever is swung according to and in timed relation with swinging movement of the panel with the gate hooks in interconnected mode with respect to the box rear end and panel,
 and a fluid operated cylinder having a piston, the cylinder beng pivotally mounted at the side of the box, and drive means for the cylinder,
 with the outermost free end of the cylinder piston being pivotally coupled to the respective panel lifting arm,
 slide means for releasably interlocking the panel with each panel lifting arm,
 with the panel, gate hook and powered linkage means all adapted and arranged for selectively shifting the panel relative to the box by simultaneous actuation of the cylinders and resultant action of the respective panel lifting arms and spring-loaded guide means between a closed position with the panel closing the open rear end of the box and the slide means in interlocking engagement with the panel lifting arm,
 and a plurality of elevated positions with the panel raised and extended rearwardly and upwardly of and spaced from the box and the slide means in interlocking engagement with the panel lifting arm
 and an extended bed position with the panel extended horizontally of and rearwardly relative to the box and the slide means out of interlocking engagement with the panel lifting arm
 and a ramp position with the panel extended rearwardly of and angularly downwardly relative to the box and the slide means out of interlocking engagement with the panel liftng arm.

* * * * *